United States Patent
Kwon et al.

(10) Patent No.: US 7,609,674 B2
(45) Date of Patent: Oct. 27, 2009

(54) DATA TRANSMISSION METHOD IN WIRELESS LAN, ACCESS POINT DEVICE AND STATION DEVICE

(75) Inventors: Chang-yeul Kwon, Seongnam-si (KR); Chil-youl Yang, Yongin-si (KR); Jon Rosdahl, West Highland, UT (US)

(73) Assignee: Samsung Electronics Co., Ltd., Suwon-si (KR)

( * ) Notice: Subject to any disclaimer, the term of this patent is extended or adjusted under 35 U.S.C. 154(b) by 657 days.

(21) Appl. No.: 11/214,820

(22) Filed: Aug. 31, 2005

(65) Prior Publication Data
US 2006/0045048 A1    Mar. 2, 2006

Related U.S. Application Data

(60) Provisional application No. 60/605,529, filed on Aug. 31, 2004.

(30) Foreign Application Priority Data
Sep. 11, 2004    (KR)    .................... 10-2004-0072821

(51) Int. Cl.
*H04W 4/00* (2009.01)
(52) U.S. Cl. .................... 370/329; 370/346
(58) Field of Classification Search ........ 370/329, 370/346, 449, 447, 461, 462
See application file for complete search history.

(56) References Cited

U.S. PATENT DOCUMENTS

| | | | |
|---|---|---|---|
| 6,754,176 B1 * | 6/2004 | Gubbi et al. | 370/230 |
| 7,095,754 B2 * | 8/2006 | Benveniste | 370/465 |
| 7,274,707 B2 * | 9/2007 | Choi et al. | 370/445 |
| 7,280,801 B2 * | 10/2007 | Dahl | 455/41.2 |
| 7,352,718 B1 * | 4/2008 | Perahia et al. | 370/329 |
| 2003/0128684 A1 * | 7/2003 | Hirsch et al. | 370/338 |
| 2005/0226270 A1 * | 10/2005 | Liu et al. | 370/469 |

FOREIGN PATENT DOCUMENTS

WO    WO 2004/051933 A2    6/2004

* cited by examiner

*Primary Examiner*—Brian D Nguyen
(74) *Attorney, Agent, or Firm*—Sughrue Mion, PLLC

(57) ABSTRACT

A data transmission method in a wireless LAN, an access point device and a station device are provided. The data transmission method for transmitting data from an access point on a wireless LAN includes allocating a sub-contention free period in which 802.11 based legacy stations and high throughput (HT) stations with multiple antennas obtain a channel use right through polling, and an HT contention period in which the HT stations can obtain a channel use right through contention. According to the method and devices, when there are no objects of polling in a contention free period, the period, in which the HT stations can obtain the channel use right though contention, is made to begin earlier such that without wasting the channel use period, the channel can be used flexibly.

22 Claims, 9 Drawing Sheets

CF-END FRAME

DATA TRANSMISSION METHOD IN WIRELESS LAN, ACCESS POINT DEVICE AND STATION DEVICE

CROSS-REFERENCE TO RELATED APPLICATIONS

This application claims priority from Korean Patent Application No. 10-2004-0072821, filed on Sep. 11, 2004, in the Korean Intellectual Property Office, and U.S. Provisional Application No. 60/605,529, filed on Aug. 31, 2004 in the United States Patent and Trademark Office, the disclosures of which are incorporated herein in their entirety by reference.

BACKGROUND OF THE INVENTION

1. Field of the Invention

The present invention relates to a method for transmitting data through a wireless local area network (WLAN), an access point device and a station device.

2. Description of the Related Art

WLANs with high speeds of over 100 Mbits/sec are now required in line with the wide penetration and development of digital products. A multiple-input-multiple-output (MIMO) technology using multiple transmission and reception antennas is recognized as one of the candidates that can satisfy this development demand. The multiple transmission and reception antennas technology includes a technique enabling high speed data transmission without increasing the bandwidth of a system by transmitting different data units at the same time by using multiple antennas for a transmitter and a receiver, and a technique obtaining transmission diversity by transmitting the same data to multiple transmission antennas. The MIMO technology is one of the adaptive array antenna technologies using a plurality of antennas to electrically control directivity, and narrows the directivity on a beam to form a plurality of independent transmission channels and increases the transmission speed as many times as the number of antennas. At this time, the frequency and transmission timing used by each antenna is identical. Also, by using multiple channels, due to the development of the technology enabling a bandwidth twice or more wider than the existing bandwidth, the transmission capability has been greatly increased.

Meanwhile, the IEEE 802.11a/g standard defines three separate 20 MHz channels and the orthogonal frequency division multiplexing (OFDM). Unlike the IEEE 802.11a/g standard implementing three separate 20 MHz wireless carrier channels, WLAN using channel bonding combines two of the carrier channels into one 40 MHz channel in order to increase the throughput. That is, the WLAN channel bonding is based on two neighboring IEEE 802.11 and OFDM channels to achieve a throughput of a large amount of data. The channel bonding doubles the size of a fast Fourier transform (FFT) and enables the FFT to multiplex twice the data amount. Except that 128 point FFT is implemented, the channel bonding follows all the processings of the original IEEE 802.11a/g standard. Also, in order to maintain a standard 802.11 symbol interval through a 40 MHz channel that is a bandwidth twice wider than that of the standard 802.11 channel, the sampling and clock rates should be doubled.

Thus, with the introduction of the MIMO technology and the channel bonding technology, legacy stations complying with the existing 802.11 standard and stations following the introduction of the new technologies can be mixedly disposed in one basic service set (BSS).

FIG. 1 is a diagram showing a BSS status in which single-input-single-output (SISO) stations and MIMO stations are mixedly disposed according to the related art technology.

Referring to FIG. 1, the BSS can include two SISO stations 110 and 120, two MIMO stations 130 and 140, and two channel bonding stations 150 and 160. The SISO station represents a legacy station complying with the conventional IEEE 802.11 standard, and the MIMO station and the channel bonding station can be regarded as high throughput stations.

Meanwhile, in a high speed WLAN based on the IEEE 802.11a/g standard, a media access control (MAC) mechanism is formed with a distributed coordination function (DCF) period in which a plurality of stations are trying to access channels in a carrier sense multiple access/collision avoidance (CSMA/CA) method. Also, in order to reduce a collision probability, a binary random backoff is performed, and a point coordination function (PCF) period in which the order of transmission of data by each station is allocated through polling scheduling centralized by an access point (AP) with an embedded point coordinator (PC). Also, by using the OFDM, a maximum data rate of 54 Mbps is supported and by using forwarding equivalence classes (FEC), a higher restoration ratio of damaged data is guaranteed.

In an IEEE 802.11 WLAN, a wireless medium is shared, and communication is performed between stations. Access to this wireless medium is controlled through a "coordination function" in a LAN module. The IEEE 802.11 WLAN supports two coordination functions, the DCF and the PCF. That is, as shown in FIG. 2, the IEEE 802.11 WLAN has a form in which the PCF 220 operates on the DCF 210.

Referring to FIG. 3, the PCF and the DCF will now be explained.

The DCF uses the CSMA/CA that is a mechanism similar to the carrier sense multiple access/collision detection (CSMA/CD), which is an access method used in the IEEE 802.3 WLAN. The PCF uses a method in which a special station referred to as a point coordinator (PC) controls medium access in a centralized method. The DCF is a contention-based service, performing a backoff mechanism in order to effectively share a given channel while preventing collision between stations to the greatest degree. In the PCF, in a contention free period (CFP) 300, a PC allocates a channel use right to stations, in order, not through channel contention, but through polling. Then, if a contention period (CP) begins, a use right is obtained through channel contention with backoff again. The CFP begins by the PC broadcasting a beacon frame 302 and ends by transmitting a CF-End frame 311. In this beacon frame, a value referred to as a network allocation vector (NAV) 330 is included. The NAV plays a role to make stations that are participating in a current network and desire to use a channel follow the control of the PC, by making the stations temporarily stop independent operations during only the CFP period. If the CFP period ends, a CP operates again according to the DCF rule.

Referring to FIG. 3, the operation of the IEEE 802.11 PCF will now be explained in more detail.

A PC broadcasts a beacon frame 302 so as to inform all stations under control of the PC of a CFP period 300.

The stations receiving the beacon 302 stop all individual operations and only a station having an address specified in a poll frame transmitted by the PC after the beacon frame has a channel access right and is enabled to transmit data.

The CFP period 300 means that the DCF function in which a channel access right is obtained through contention is temporarily stopped and a mechanism for channel access through polling by a PC begins.

After the beacon frame, the PC performs polling in order based on a predefined polling list. If there is data to be transmitted to a station of which turn it is for polling, the PC loads data on a polling frame 304 and transmits to the station, and if the PC has no data to transmit, only the polling frame 304 is transmitted to the station so that the station can have an opportunity to transmit data. Then, the station receiving this polling frame transmits an ACK frame 306, as a reception confirmation response, to the PC, after a short inter-frame space (SIFS) 305 that is a time to prepare a response elapses. As in the polling frame, if there is data to transmit, the station loads the data in the ACK frame 306 and transmits the data, and if there is no data to transmit, the station transmits only the ACK frame 306 to the PC.

Based on the polling list, the PC repeats this process with stations registered in the polling list.

If the CFP ends or if all the stations in the polling list are polled once before the CFP ends, the PC broadcasts CF-End frame 311 to return the control right held by the PC till that time, to all stations such that channel contention can be started.

However, a case where different systems are mixedly disposed as in the BSS shown in FIG. 1, that is, a BSS of a WLAN where legacy stations complying with the existing 802.11 standard and high throughput stations (for example, MIMO stations or SISO stations using the channel bonding technology) are coexisting can be thought of. In this case, since in the related art legacy stations, a transmission frame of a high throughput station cannot be recognized, there is a possibility of collision because of communication by the legacy stations during transmission by high throughput stations. Accordingly, in the related art technology using the structure in which a channel access right is obtained through contention, the channel access right cannot be guaranteed for high throughput stations in a system where legacy stations and high throughput stations are mixedly disposed.

SUMMARY OF THE INVENTION

Illustrative, non-limiting embodiments of the present invention overcome the above disadvantages and other disadvantages not described above. Also, the present invention is not required to overcome the disadvantages described above, and an illustrative, non-limiting embodiment of the present invention may not overcome any of the problems described above.

The present invention provides a data transmission method in a WLAN, an access point device and a station device by which safe communication can be guaranteed on the WLAN in which high throughput stations using the MIMO technology and channel bonding technology and legacy stations complying with 802.11a, b, and g are mixedly disposed.

According to an aspect of the present invention, there is provided a data transmission method for transmitting data from an access point on a WLAN, including: allocating a sub-contention free period in which legacy stations (in exemplary embodiments, 802.11 based legacy stations) and high throughput (HT) stations with multiple antennas obtain a channel use right through polling, and an HT contention period in which the HT stations obtain a channel use right through contention, in a contention free period where a channel use right is obtained through polling; and transmitting a sub-contention free period termination message indicating the termination of the sub-contention free period, to the HT stations before the sub-contention free period expires.

The allocating of the sub-contention free period and the HT contention period may include: transmitting a beacon frame including information indicating the length of the contention free period and information indicating the length of the HT contention period, to the legacy stations and the HT stations.

The transmitting of the sub-contention free period termination message may include transmitting a CF-END control frame in a modulation method or at a high transmission rate interpretable by the HT stations.

The HT stations may include multiple input multiple output (MIMO) stations and stations using channel bonding and having a single antenna.

According to another aspect of the present invention, there is provided a data transmission method for transmitting data from a station on a WLAN, including: receiving information on a CFP in which a channel use right is obtained through polling and information on an HT contention period in which HT stations obtain a channel use right through contention, from an access point; allocating a Sub-CFP in which 802.11 based legacy stations and HT stations having multiple antennas are polled and obtain a channel use right with a length of (the length of the contention free period—the length of the HT contention period); and if a sub-contention free period termination message indicating the termination of the sub-contention free period is received from the access point before the sub-contention free period expires, obtaining a channel use right through contention among the HT stations.

The receiving of the information may include: receiving a beacon frame including the information on the contention free period and the HT contention period from the access point.

The allocating the sub-contention free period may include setting (the length of the contention free period—the length of the HT contention period) as a NAV.

The obtaining of the channel use right may include receiving a CF-END control frame in a modulation method or at a high transmission rate interpretable by the HT stations from the access point.

The HT stations may include MIMO based stations and stations using channel bonding and having a single antenna.

According to still another aspect of the present invention, there is provided an access point on a wireless LAN, including: an HT contention period allocation unit allocating a Sub-CFP in which 802.11 based legacy stations and HT stations with multiple antennas obtain a channel use right through polling, and an HT contention period in which the HT stations obtain a channel use right through contention, in a CFP where a channel use right is obtained through polling; and a sub-contention free period adjusting unit transmitting a Sub-CFP termination message indicating the termination of the sub-contention free period, to the HT stations before the Sub-CFP period expires.

According to yet still another aspect of the present invention, there is provided a station on a wireless LAN, including: a frame reception unit receiving information on a CFP in which a channel use right is obtained through polling and information on an HT contention period in which HT stations obtain a channel use right through contention, from an access point; a sub-contention free period allocation unit allocating a Sub-CFP in which 802.11 based legacy stations and HT stations having multiple antennas are polled and obtain a channel use right with a length of (the length of the contention free period—the length of the HT contention period); and a contention performing unit obtaining a channel use right through contention among the HT stations if a Sub-CFP termination message indicating the termination of the Sub-CFP is received from the access point before the sub-contention free period expires.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF EXEMPLARY EMBODIMENTS OF THE INVENTION

The present invention will now be described more fully with reference to the accompanying drawings, in which exemplary embodiments of the invention are shown.

Aspects of the present invention, and methods for achieving them will be apparent to those skilled in the art from the detailed description of the exemplary embodiments together with the accompanying drawings. However, the scope of the present invention is not limited to the exemplary embodiments disclosed in the specification, and the present invention can be realized in various types. The described exemplary embodiments are presented only for completely disclosing the present invention and helping those skilled in the art to completely understand the scope of the present invention, and the present invention is defined only by the scope of the claims.

Figure 1:
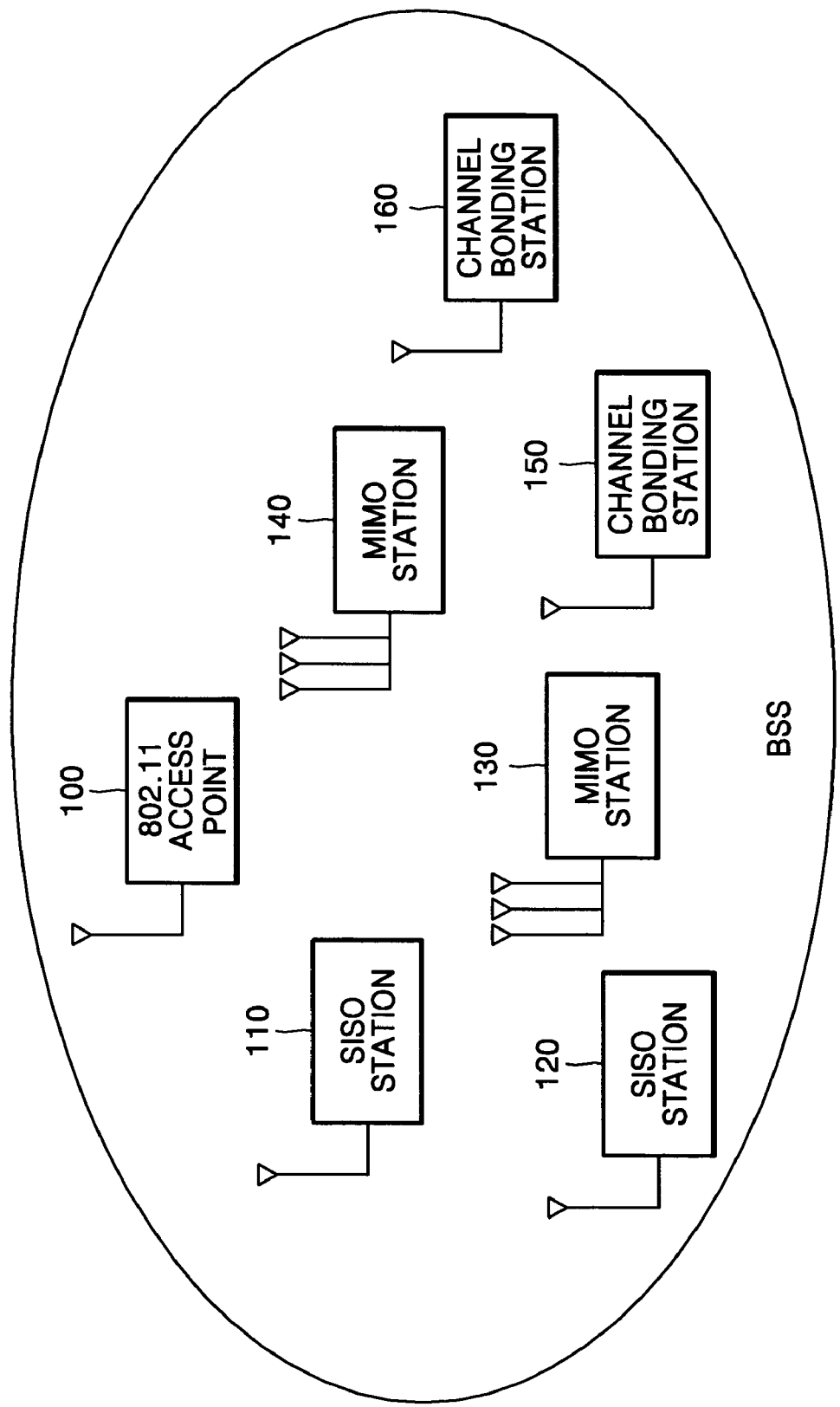
FIG. 1 is a diagram showing a BSS state in which SISO stations and MIMO stations are mixedly disposed according to related art technology.
Figure 2:
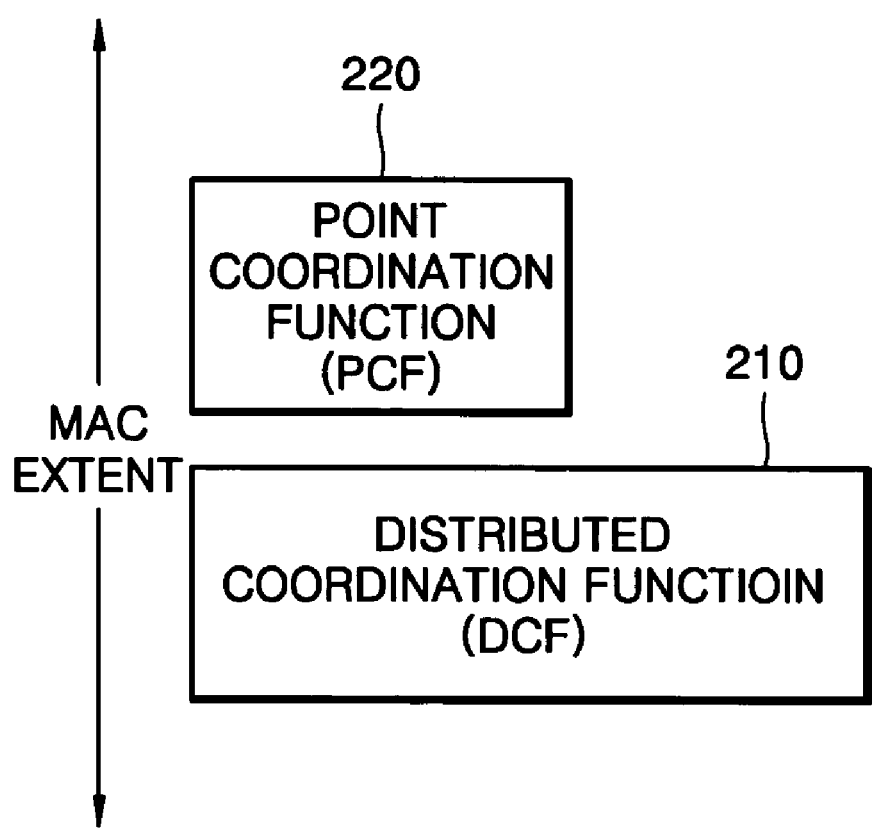
FIG. 2 is a diagram showing the structure of a PCF built on a DCF according to related art technology.
Figure 3:
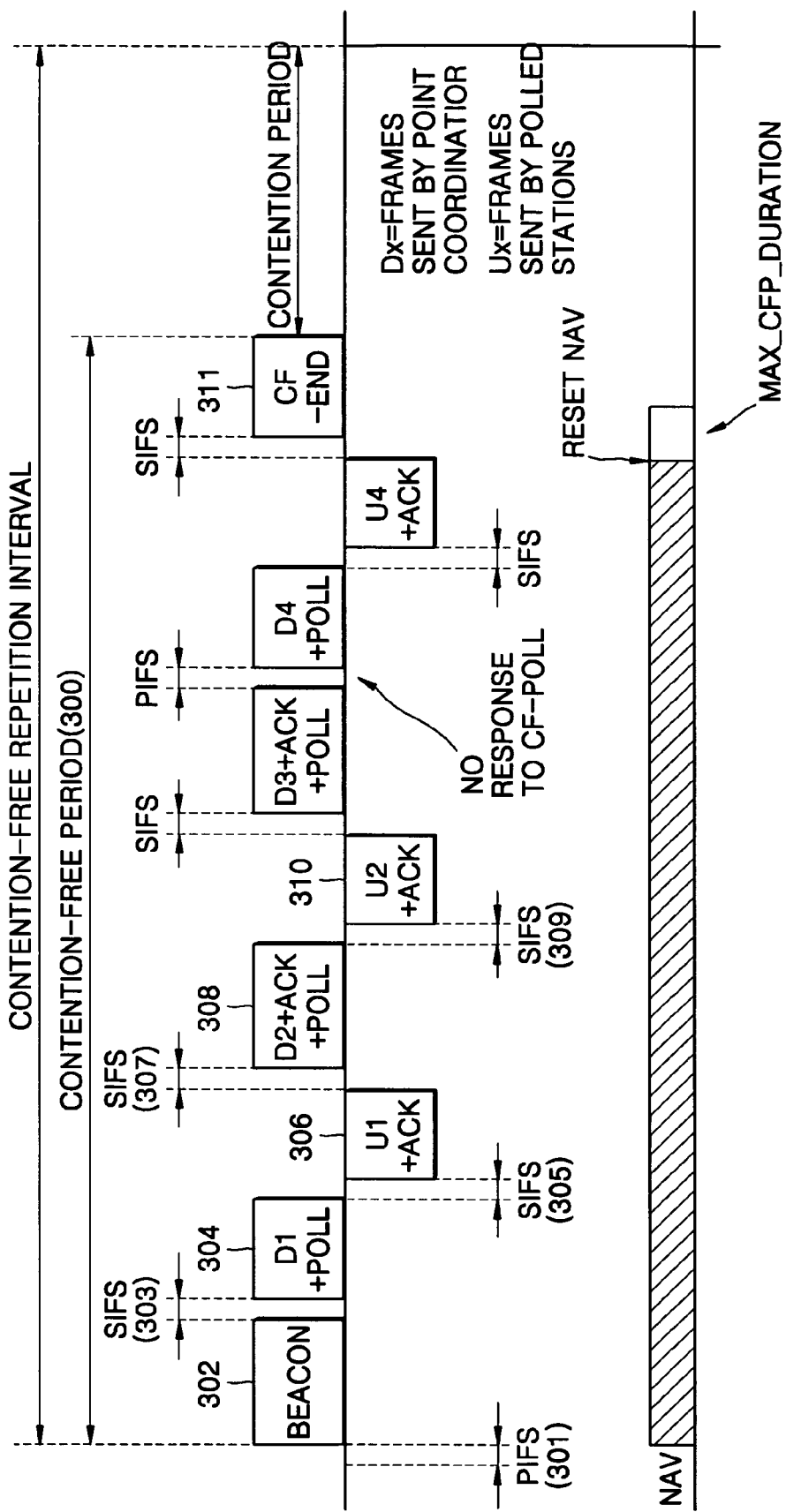
FIG. 3 is a diagram for explaining data items transmitted and received in the PCF according to related art technology.
Figure 4:
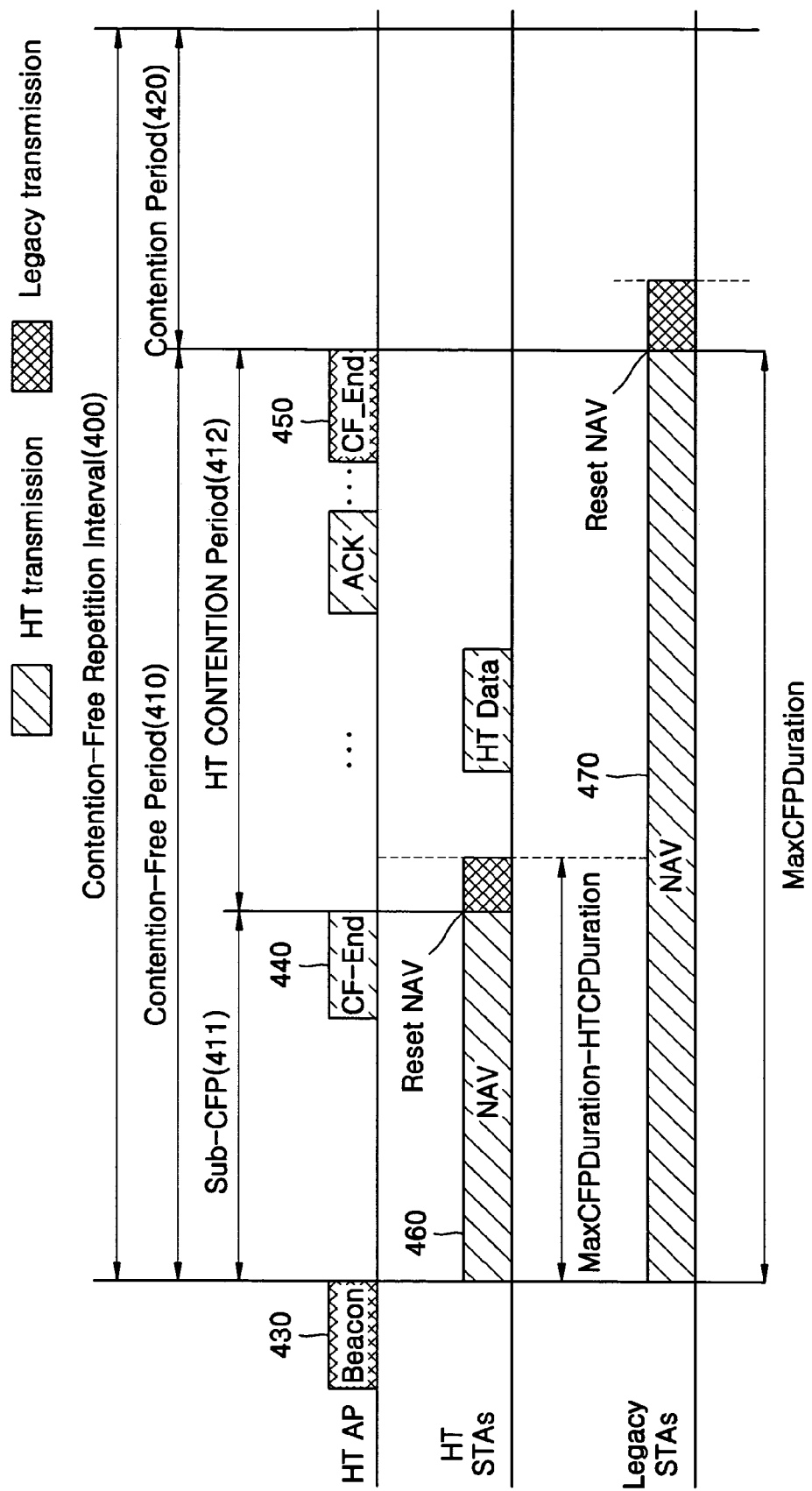
FIG. 4 is a reference diagram explaining allocation of a contention free period according to an exemplary embodiment of the present invention.

Referring to FIG. 4, a contention free repetition interval 400 is formed with a contention free period 410 and a contention period 420.

The contention period 420 is a period in which legacy station and HT stations are obtaining a channel use right through contention all together. Though only stations using the MIMO technology and the channel bonding technology are mentioned above as HT stations, the HT stations are not limited to these and may also include those stations complying with a technology to be developed, for example, equivalent to the MIMO or channel bonding.

A contention free period 410 is a period in which stations are obtaining a channel use right by the polling operation of an AP according to the related art technology, but the contention free period 410 according to the present invention is formed with a sub-contention free period 411 and an HT contention period 412.

The sub-contention free period 411 indicates a period in which legacy stations and HT stations all are obtaining a channel use right by the polling operation of the AP. The HT contention period 412 indicates a contention period for exclusive use by HT stations in which only HT stations are obtaining a channel use right through contention.

The HT AP transmits periodically a management frame referred to as a beacon 430, and in this beacon 430, predefined time interval information defining a contention free period and a contention period is loaded. This contention free period is again divided into an HT contention period for communication between HT stations and the remaining period that is a contention free period, excluding this HT contention period. The timing control for this is performed first by the HT AP capable of communicating both an HT frame and a legacy frame, loading CF parameter information element including MaxCFPDuration and BSS status information element including HTCPDuration information in a beacon and transmitting it.

The HT stations and legacy stations receiving this beacon set a NAV value such that transmission is held back during MaxCFPDuration. Since the legacy stations can recognize only the formats complying with the conventional 802.11 frame, the legacy stations extract the MaxCFPDuration value included in the beacon frame and set this as a NAV 470. The HT stations can detect the HTCPDuration field included in the beacon frame set according to the present invention, and therefore sets (MaxCFPDuration-HTCPDuration) as a NAV 460.

During the Sub-CFP 411, the HT AP controls transmission and reception and after this period (MaxCFPDuration-HTCPDuration) only HT stations begin contention and transmission. At this time, in the Sub-CFP, even before (MaxCFPDuration-HTCPDuration) that is originally set expires, the period can be finished by the AP transmitting a CF-end control frame that can be recognized by the HT stations. If this CF-end (HT compliant) frame cannot be received, after (MaxCFPDuration-HTCPDuration), the NAV in each HT expires such that the HT CP begins. The HT CP period is reset by the AP transmitting a CF-end (legacy compliant, for example, IEEE 802.11 a) frame, and after that a contention period begins.

Figure 5:
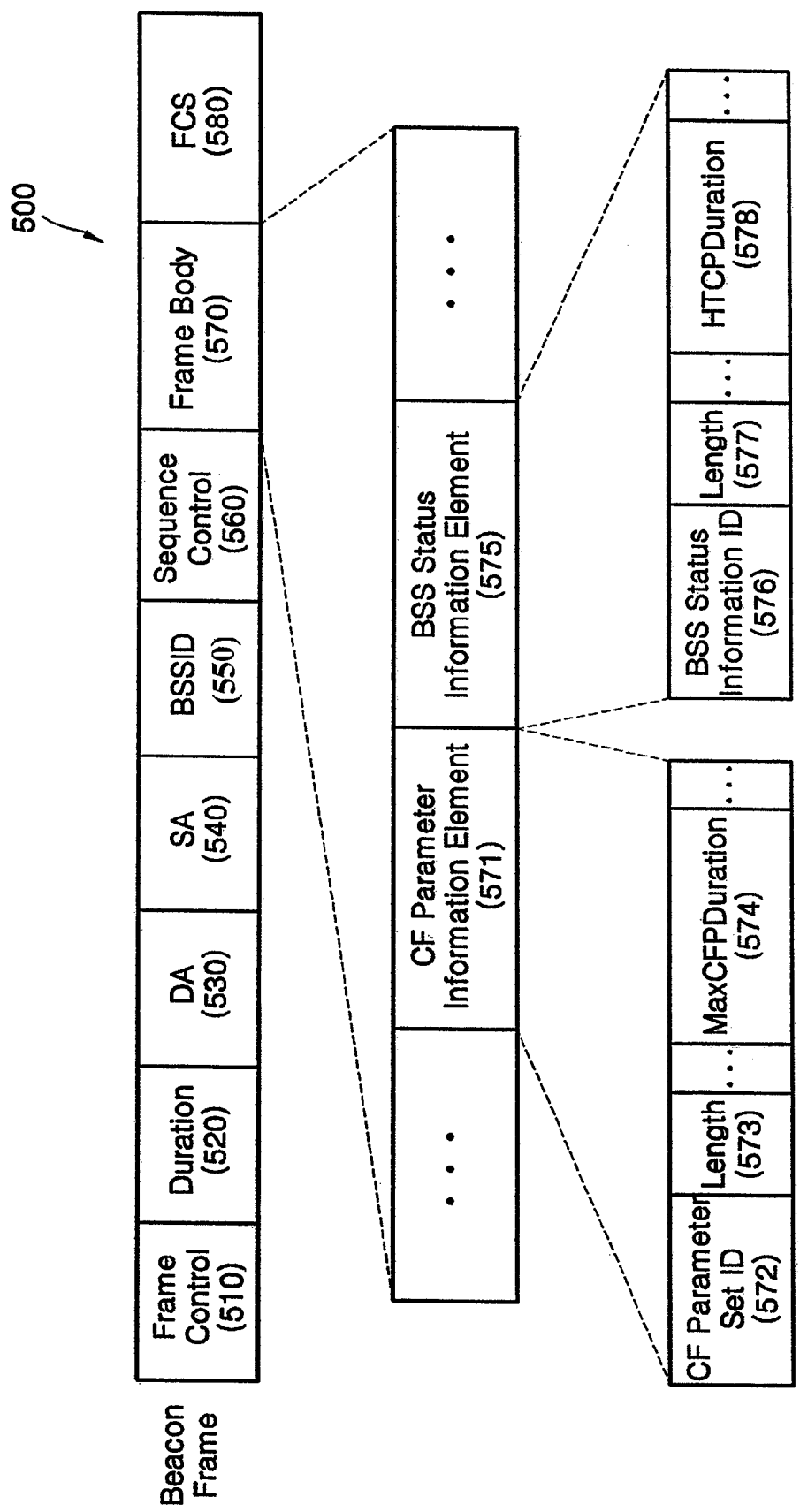
FIG. 5 is a diagram of the data structure of a beacon frame according to an exemplary embodiment of the present invention.

FIG. 5 is a diagram of the data structure of a beacon frame according to the present invention.

Referring to FIG. 5, the beacon frame 500 that is one of management frames complying with the IEEE 802.11 standard includes a frame control field 510, a duration field 520, a destination address (DA) field 530, a source address (SA) field 540, a BSSID field 550, a sequence control field 560, a frame body field 570, and an FCS field 580.

Among these fields, a field loading MaxCFPDuration and HTCPDuration according to the present invention form the frame body field 670 which includes one or more information elements. Other fields are the same as in the related art technology and therefore further explanation thereof will be omitted.

The frame body 570 is formed with one or more information elements.

Referring to FIG. 5, the frame body 570 includes a CF parameter information element field 571 containing a set of parameters required to support the PCF and a BSS status information element field 575 containing a set of parameters required to support a BSS defined according to the present invention.

The CF parameter information element 571 includes a CF parameter set ID 572 field, a length field 573, and a MaxCF-PDuration field 574. The CF parameter set ID 572 is the identifier of a CF parameter information element, and the length 573 indicates the length of information. The MaxCF-PDuration 574 is a value used to set a NAV by legacy station and HT stations. The legacy stations set this value directly as the NAV, and the HT stations use this value together with HTCPDuration 578 (discussed below) to set as the NAV.

The BSS status information element 575 includes a BSS status information ID field 576, a length field 577, and the HTCPDuration field 578. The BSS status information ID 576 is the identifier of a BSS status information element and the length 577 indicates the length of information. The HTCP-Duration 578 is a value to be used together with the CFPMax-Duration by HT stations to set the NAV.

Figure 6:
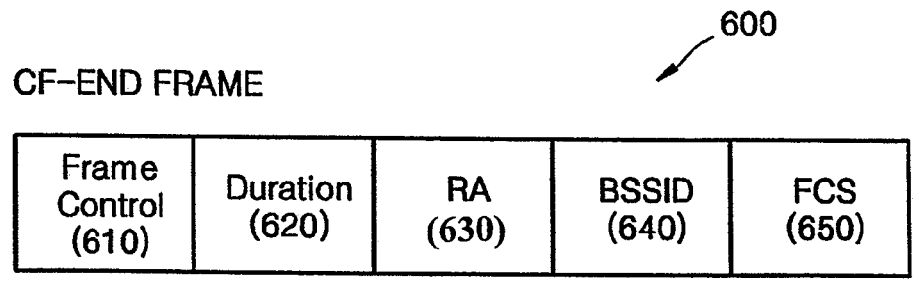
FIG. 6 is a diagram of the data structure of a CF-END frame used in an exemplary embodiment of the present invention.

FIG. 6 is a diagram of the data structure of a CF-END frame used in an exemplary embodiment of the present invention.

Referring to FIG. 6, the CF-END frame 600 includes a frame control field 610, a duration field 620, a receiver address (RA) 630, a basic service set identifier (BSSID) 640, and a frame check sequence (FCS) 650. The contents of each field is the same as defined according to the related art technology, and in the present invention, in order to transmit this CF-END frame 600 only to HT stations, this CF-END frame 600 is generated by using a modulation method that can be interpreted by the HT stations and transmitted, or is transmitted as a data transmission object that can be obtained by only the HT stations.

Figure 7:
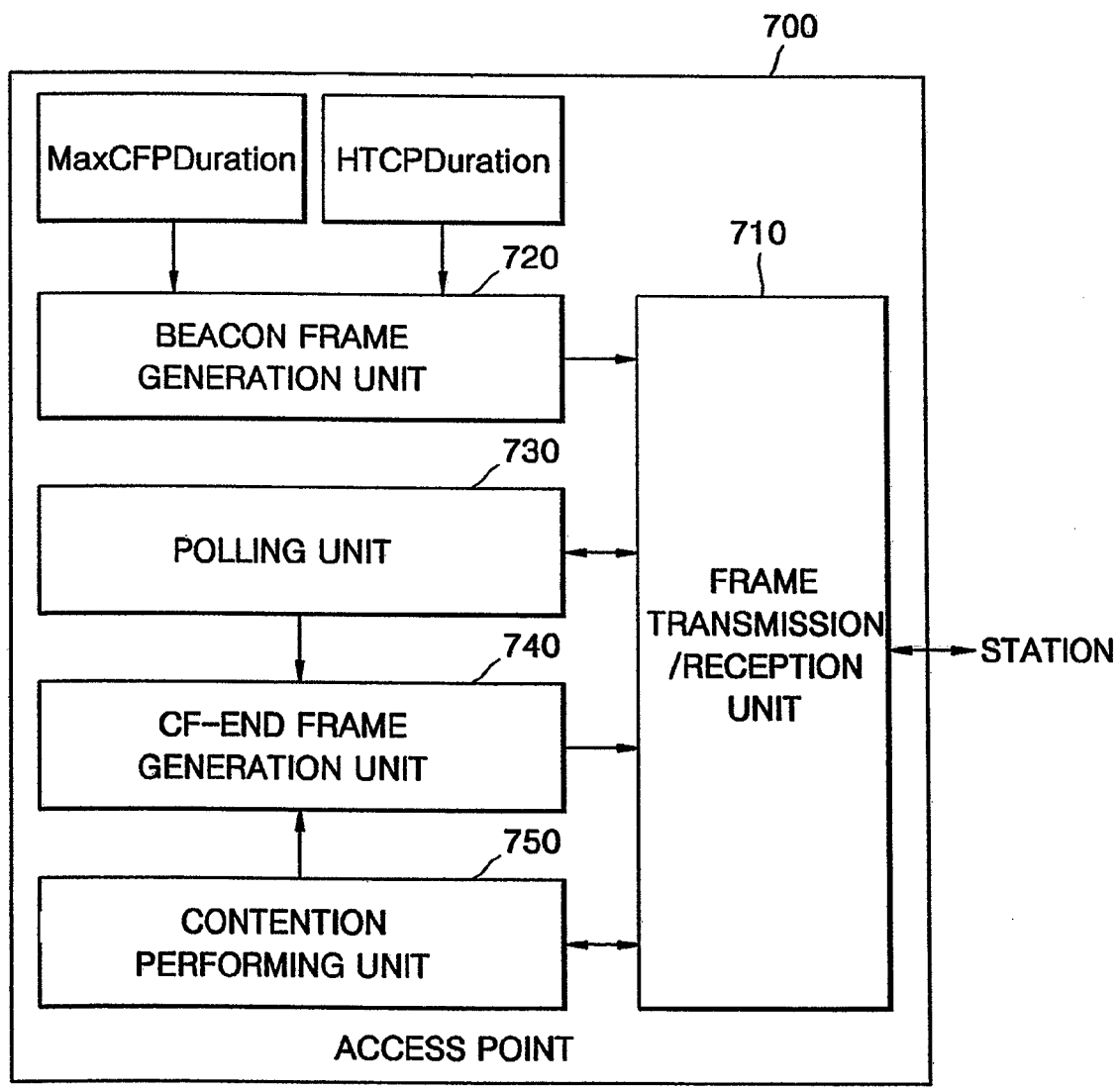
FIG. 7 is a schematic diagram of the structure of an access point device according to an exemplary embodiment of the present invention.

FIG. 7 is a schematic diagram of the structure of an access point device according to the present invention.

Referring to FIG. 7, the access point device 700 includes a frame transmission and reception unit 710, a beacon frame generation unit 720, a polling unit 730, a CF-END frame generation unit 740, and a contention performing unit 750.

The frame transmission and reception unit 710 transmits and received frames, that is, a management frame, a control frame, a data frame, etc., between an AP and stations.

The beacon frame generation unit 720 generates a beacon frame that is periodically transmitted to stations in each contention free repetition interval. In particular, according to the present invention, the beacon frame generation unit 720 generates a beacon frame including MaxCFPDuration information and HTCPDuration information as shown in FIG. 5.

The polling unit 730 performs polling of legacy stations and HT stations during the (MaxCFPDuration-HTCPDuration) period and grants a channel use right to stations and also performs transmitting data frames to and receiving data frames from stations. Also, according to the present invention, in case where it is decided to end this sub-contention free period, including a case where there is no more object to poll even if the sub-contention free period (MaxCFPDuration-HTCPDuration) does not expire, the polling unit 730 informs the CF-END frame generation unit 740 of this decision.

The CF-END frame generation unit 740, if a signal from the polling unit 730 or the contention performing unit 750 is received, generates a CF-END control frame. If a signal from the polling unit 730 is received, the CF-END frame generation unit 740 controls in order to inform the HT stations of the end of the sub-contention free period such that the CF-END control frame is generated in a modulation method that can be interpreted by the HT stations, or this CF-END control frame is transmitted in a data transmission rate that can be obtained by the HT stations. Meanwhile, if a signal from the contention performing unit 750 is received, in order to inform both legacy stations and the HT stations of the end of the contention free period, the CF-END frame generation unit 740 transmits the CF-END control frame in a modulation method and a data transmission rate that can be interpreted and obtained by the legacy stations. The data frame that can be interpreted by the legacy stations can be interpreted by the HT stations.

The contention performing unit 750 controls such that during the HT CP period, contention is performed by HT stations and during the contention period, contention is performed by legacy stations and HT stations. The AP also participates in this contention and performs operations for transmitting and receiving a data frame.

Figure 8:
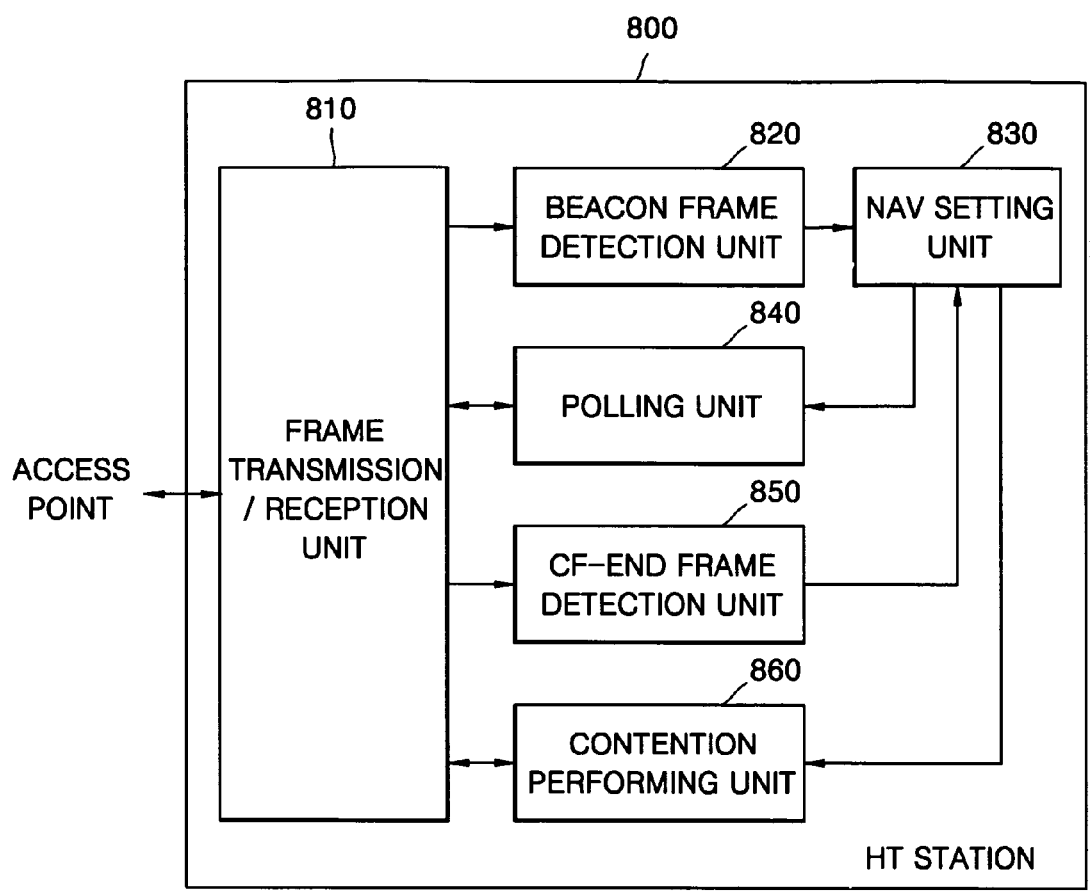
FIG. 8 is a schematic diagram of the structure of an HT station device according to an exemplary embodiment of the present invention.

FIG. 8 is a schematic diagram of the structure of an HT station device according to the present invention.

Referring to FIG. 8, the HT station device 800 includes a frame transmission/reception unit 810, a beacon frame detection unit 820, a NAV setting unit 830, a polling unit 840, a CF-END frame detection unit 850, and a contention performing unit 860.

The frame transmission/reception unit 810 receives a management frame, a control frame, a data frame, etc., transmitted by an AP, and transmits a data frame.

The beacon frame detection unit 820 detects a beacon frame from an AP received through the frame transmission/reception unit 810, and from this, extracts MaxCFPDuration information and HTCPDuration information and transmits to the NAV setting unit 830.

By using the received MaxCFPDuration information and HTCPDuration information, the NAV setting unit 830 calculates (MaxCFPDuration-HTCPDuration), sets this as a NAV, and transmits the set NAV value to the polling unit 840. Also, the NAV setting unit 830, if a signal from the CF-END frame detection unit 850 is received, resets the NAV as expired, and transmits a signal indicating that the NAV has expired, to the contention performing unit 860.

The polling unit 840 does not contend during the set NAV period, and if a polling signal from an AP is received, transmits an ACK signal to this and performs transmission and reception of a data frame.

The CF-END frame detection unit 850 detects a CF-END frame from an AP received through the frame transmission and reception unit 810. Since the CF-END frame indicates the end of a sub-contention free period, the CF-END frame detection unit 850 transmits a signal to the NAV setting unit 830 such that the NAV setting unit 830 can reset the NAV as expired.

The contention performing unit 860, if a signal indicating that the NAV expired is received from the NAV setting unit 830, learns that the sub-contention free period has ended, and obtains a channel selection right through contention. At this time, since in the HT contention period following the ended sub-contention free period, only HT stations contend, transmission of data can be guaranteed more stably.

Figure 9:
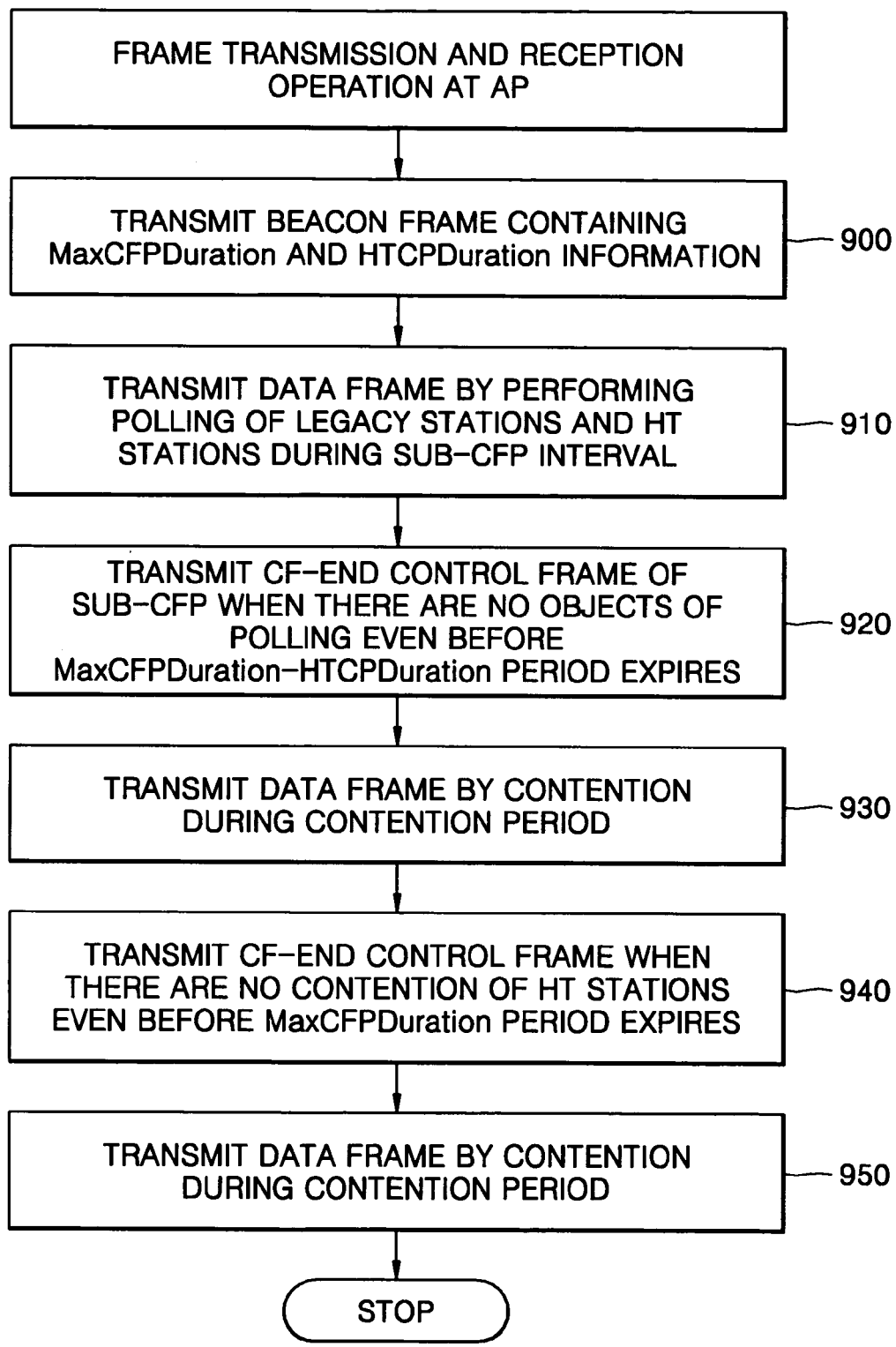
FIG. 9 is a flowchart showing a process of transmitting and receiving a frame in an access point device according to an exemplary embodiment of the present invention.

FIG. 9 is a flowchart showing a process of transmitting and receiving a frame in an access point device according to the present invention. Referring to FIG. 9, an AP transmits a beacon frame, including MaxCFPDuration and HTCPDuration information, to stations in operation 900.

Both legacy stations and HT stations receive this beacon frame. However, legacy stations detect only MaxCFPDuration that can be recognized by the legacy stations, from the beacon frame and set this as a NAV, while HT stations detect both MaxCFPDuration and HTCPDuration that can be recognized by the HT stations, and set (MaxCFPDuration-HTCPDuration) as a NAV.

During the sub-CFP period that is the sub-contention free period newly set according to the present invention, i.e., during (MaxCFPDuration-HTCPDuration), the AP performs polling of the legacy stations and HT stations and transmits a data frame in operation 910.

While performing polling, if there are no objects of polling even before the (MaxCFPDuration-HTCPDuration) expires, the AP transmits a CF-END control frame indicating that the sub-contention free period ends, to HT stations in operation 920.

At this time, in order to give an opportunity only to the HT stations, a CF-END control frame is generated in a modulation method that can be interpreted only by the HT stations and is transmitted, or a CF-END control frame is transmitted at a higher transmission rate. Since the HT stations can identify this CF-END frame, the HT stations, if this frame is received, understand that the NAV has expired, and participate in contention to obtain a channel use right. Since the legacy stations cannot identify this CF-END frame, the sub-contention free period is maintained without change. Thus, by the AP transmitting a message to end the sub-contention free period even before the expiration of the sub-contention free period, a period in which HT stations can contend is made to begin beforehand such that waste of channels can be prevented.

Then, during the contention period, that is, the contention period (HT CP) only for the HT stations, the AP obtains a channel use right through contention and transmits a data frame in operation 930.

While thus performing contention, the AP transmits a CF-END control frame indicating that the sub-contention free period ends, to the HT stations and the legacy stations if there are no stations trying to obtain a channel use right or there is rare traffic even before the expiration of the MaxCFPDuration period in operation 940. In this case, since the HT stations have already been in the contention period, the HT stations would try to obtain a channel use right through contention in the same manner, and the legacy stations that were in the contention free period understand that the NAV has expired and begin to participate in the contention.

A next AP obtains a channel use right through contention during a contention period, that is, a period in which the HT stations and legacy stations can contend, and transmits a data frame in operation 950.

Figure 10:
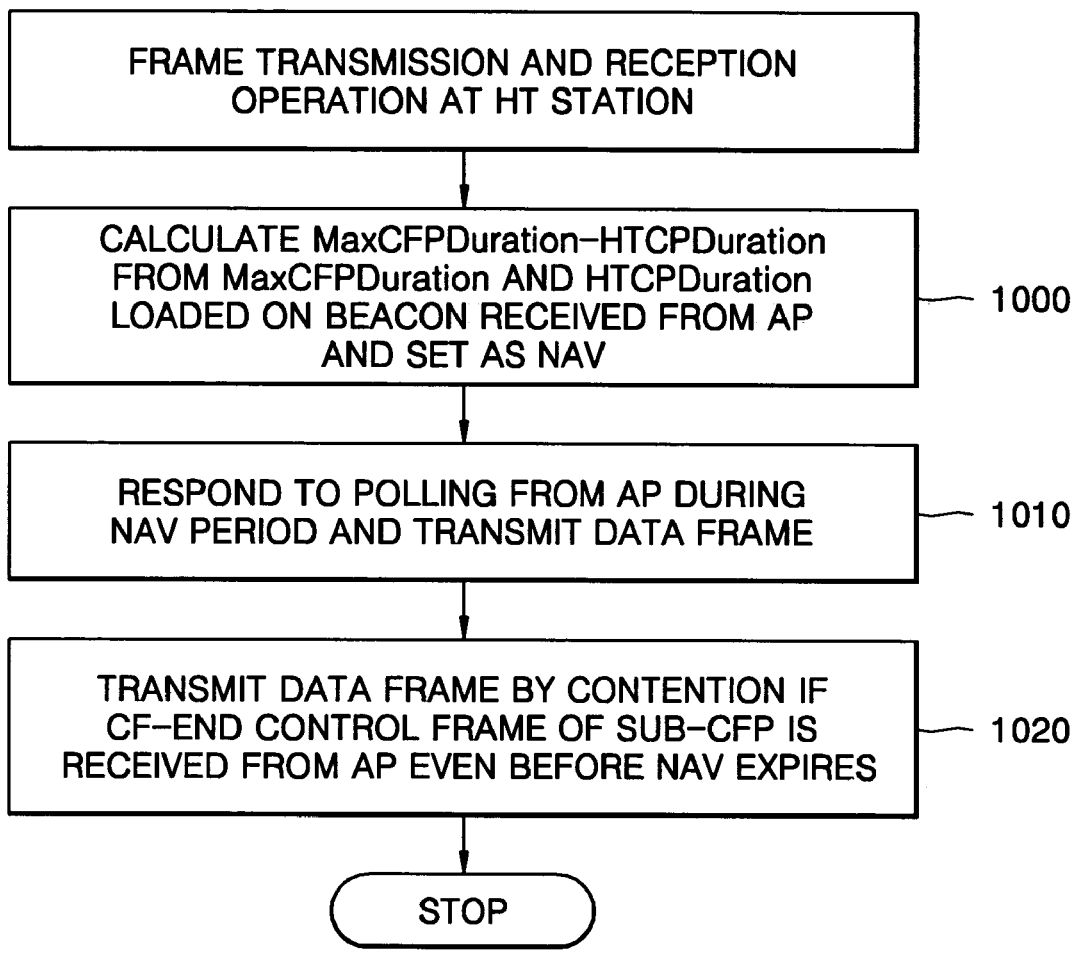
FIG. 10 is a flowchart showing a process of transmitting and receiving a frame in an HT station device according to an exemplary embodiment of the present invention.

FIG. 10 is a flowchart showing a process of transmitting and receiving a frame in an HT station device according to the present invention. Referring to FIG. 10, the HT station calculates (MaxCFPDuration-HTCPDuration) from MaxCFP-Duration and HTCPDuration contained in a beacon received from an AP and sets as an NAV in operation 1000.

Next, during the set NAV period, the HT station responds to the polling from the AP, transmits a data frame, and receives a data frame in operation 1010.

Thus, during transmission and reception of data by polling, if a CF-END control frame of a sub-CFP from an AP is received, the HT station resets the NAV as expired, and by understanding that the sub-contention free period ends and a contention period begins, transmits a data frame through contention in operation 1020.

The data transmission and reception method as described above can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. Also, functional programs, codes, and code segments for accomplishing the present invention can be easily construed by programmers skilled in the art to which the present invention pertains.

While the present invention has been particularly shown and described with reference to exemplary embodiments thereof, it will be understood by those of ordinary skill in the art that various changes in form and details may be made therein without departing from the spirit and scope of the present invention as defined by the following claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

According to the present invention as described above, by providing a period in which only HT stations can obtain a channel use right through contention, only to HT stations coexisting with legacy stations on a WLAN, collision with legacy stations can be prevented such that reliability of data transmission can be improved. Furthermore, when there are no objects of polling in a contention free period, the period, in which the HT stations can obtain the channel use right though contention, is made to begin earlier such that without wasting the channel use period the channel can be used flexibly.

What is claimed is:

1. A data transmission method for transmitting data from an access point on a wireless local area network, the method comprising:

allocating a sub-contention free period in which legacy stations and high throughput (HT) stations with multiple antennas obtain a channel use right through polling, and an HT contention period in which the HT stations obtain a channel use right through contention, in a contention free period where a channel use right is obtained through polling; and transmitting a sub-contention free period termination message indicating a termination of the sub-contention free period, to the HT stations before the sub-contention free period expires, wherein at least one of the allocating and transmitting is performed using a processor of the access point on the wireless local area network.

2. The method of claim 1, wherein the allocating of the sub-contention free period and the HT contention period comprises transmitting a beacon frame including information indicating a length of the contention free period and information indicating the length of the HT contention period, to the legacy stations and the HT stations.

3. The method of claim 1, wherein the transmitting of the sub-contention free period termination message comprises transmitting a CF-END control frame in at least one of a modulation method and at a high transmission rate interpretable by the HT stations.

4. The method of claim 1, wherein the HT stations include multiple-input-multiple-output (MIMO) stations and stations using channel bonding and having a single antenna.

5. The method of claim 1, wherein the legacy stations comprise IEEE 802.11 based legacy stations.

6. A data transmission method for transmitting data from a station on a wireless local area network, the method comprising:

receiving information on a contention free period (CFP) in which a channel use right is obtained through polling and information on a high-throughput (HT) contention period in which HT stations obtain a channel use right through contention, from an access point;

allocating a sub-contention free period (Sub-CFP) in which legacy stations and HT stations having multiple antennas are polled and obtain a channel use right with a length of at least one of the contention free period and the HT contention period; and if a sub-contention free period termination message indicating a termination of the sub-contention free period is received from the access point before the sub-contention free period expires, obtaining a channel use right through contention among the HT stations, wherein the sub-contention free period termination message is received only by the HT stations, and wherein at least one of the receiving, the allocating, and the obtaining is performed using a processor of the station on the wireless local area network.

7. The method of claim 6, wherein the legacy stations are IEEE 802.11 based legacy stations.

8. The method of claim 6, wherein the receiving of the information comprises receiving a beacon frame including the information on the contention free period and the HT contention period from the access point.

9. The method of claim 6, wherein the allocating the sub-contention free period comprises setting the length of at least one of the contention free period and the HT contention period as a network allocation vector (NAY).

10. The method of claim 6, wherein the obtaining of the channel use right comprises receiving a CF-END control frame in a modulation method or at a high transmission rate interpretable by the HT stations from the access point.

11. The method of claim 6, wherein the HT stations includes multiple-input-multiple-output (MIMO) based stations and stations using channel bonding and having a single antenna.

12. An access point on a wireless local area network comprising:

a high-throughput contention period allocation unit which allocates a sub-contention free period (Sub-CFP) in which legacy stations and LIT stations with multiple antennas obtain a channel use right through polling, and an HT contention period in which the LIT stations obtain a channel use right through contention, in a contention free period (CFP) where a channel use right is obtained through polling; and a Sub-CFP adjusting unit which transmits a Sub-CFP termination message indicating a termination of the Sub-CFP, to the HT stations before the Sub-CFP expires, wherein the Sub-CFP termination message is received only by the HT stations.

13. The access point of claim 12, wherein the legacy stations are 802.11 based legacy stations.

14. The access point of claim 12, wherein the HT contention period allocation unit transmits a beacon frame including information indicating a length of the contention free period and information indicating the length of the HT contention period, to the legacy stations and the HT stations.

15. The access point of claim 12, wherein the sub-contention free period adjusting unit transmits a CF-END control frame in a modulation method or at a high transmission rate interpretable by the HT stations.

16. The access point of claim 12, wherein the HT stations include multiple-input-multiple-output based stations and stations using channel bonding and having a single antenna.

17. A station on a wireless local area network comprising:

a frame reception unit which receives information on a contention free period (CFP) in which a channel use right is obtained through polling and information on a high-throughput contention period in which HT stations obtain a channel use right through contention, from an access point;

a sub-contention free period (Sub-CFP) allocation unit which allocates a Sub-CFP in which legacy stations and HT stations having multiple antennas are polled and obtain a channel use right with a length of at least one of the CFP and the HT contention period; and a contention performing unit which obtains a channel use right through contention among the HT stations if a Sub-CFP termination message indicating a termination of the Sub-CFP is received from the access point before the Sub-CFP expires, wherein the Sub-CFP termination message is received only by the HT stations.

18. The station of claim 17, wherein the frame reception unit receives a beacon frame including the information on the CFP and the HT contention period from the access point.

19. The station of claim 17, wherein the sub-contention free period allocation unit comprises a network allocation vector (NAY) setting unit setting the length of at least one of the CFP and the UT contention period as an NAY.

20. The station of claim 17 wherein the Sub-CFP termination message is received by receiving a CF-END control frame in a modulation method or at a high transmission rate interpretable by the UT stations from the access point.

21. The station of claim 17, wherein the HT stations includes multiple-input-multiple-output (MIMO) based stations and stations using channel bonding and having a single antenna.

22. The station of claim 17, wherein the legacy stations are IEEE 802.11 based legacy stations.

* * * * *

UNITED STATES PATENT AND TRADEMARK OFFICE
CERTIFICATE OF CORRECTION

PATENT NO. : 7,609,674 B2  Page 1 of 1
APPLICATION NO. : 11/214820
DATED : October 27, 2009
INVENTOR(S) : Kwon et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1079 days.

Signed and Sealed this

Twelfth Day of October, 2010

David J. Kappos
*Director of the United States Patent and Trademark Office*